(No Model.)

S. CHAMBERS.
CASTER.

No. 490,424. Patented Jan. 24, 1893.

Witnesses.
E. B. Bolton
E. K. Sturtevant

Inventor.
Samson Chambers
By Richards & R
his Attorneys.

THE NORRIS PETERS CO., PHOTO-LITHO., WASHINGTON, D. C.

UNITED STATES PATENT OFFICE.

SAMSON CHAMBERS, OF SHEFFIELD, ENGLAND.

CASTER.

SPECIFICATION forming part of Letters Patent No. 490,424, dated January 24, 1893.

Application filed May 19, 1892. Serial No. 433,538. (No model.) Patented in England July 9, 1891, No. 11,660.

*To all whom it may concern:*

Be it known that I, SAMSON CHAMBERS, a subject of the Queen of Great Britain, and a resident of Sheffield, in the county of York, England, have invented certain new and useful Improvements in Casters for Furniture; and I do hereby declare that the following is a full, clear, and exact description thereof, reference being had to the accompanying drawings, which form a part of this specification.

This invention has been patented to me in Great Britain under date July 9, 1891, No. 11,660.

This invention relates to improvements in the construction of furniture casters, the objects of the invention being to avoid damage to carpets, to render them noiseless, and to enable them to be attached and detached with greater facility.

The invention is illustrated in the annexed sheet of drawings, in which like letters of reference, refer to corresponding parts in the several figures.

Figure 1:
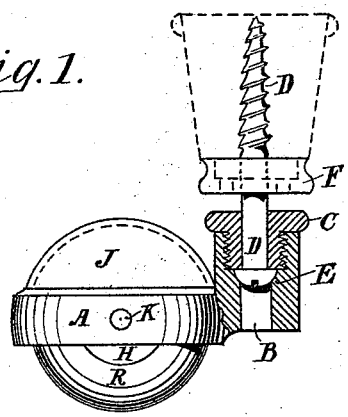
Figure 2:
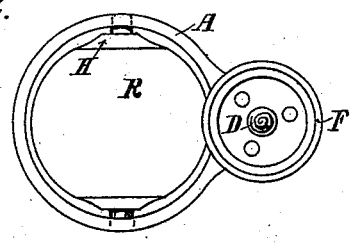
Figure 3:
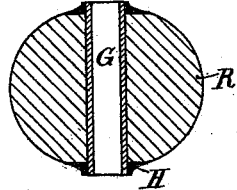
Figure 4:
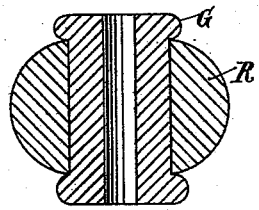

Figure 1, is an elevation of a caster made after my invention, part being shown in section. Fig. 2, plan of same. Fig. 3, section of roller. Fig. 4, section of a roller with glass bush.

In carrying out my invention in the construction of a caster as illustrated in Fig. 1, I make a metal framework A, consisting of the shank, or part to be attached to the furniture, and the frame to hold the roller, which I prefer to be ring-shaped. The shank is prepared with a hole B, made completely through it, the upper part of said hole being enlarged and screwthreaded to receive a gland or perforated nut C, through which the large screw D, is passed from the underside; the head of the screw when it is in position rests upon a shoulder or seating E, formed by the bottom of the enlarged upper part of the opening. The under portion of the hole B, being open to the head of the screw D, a turnscrew can be used to operate the screw, by which the attachment or removal of the caster is greatly facilitated. The cup F, or its substitute, a socket, to receive the leg of the piece of furniture to which it is to be attached, is made fast to the screw D.

The roller R, is made of rubber, of a spherical configuration, having a hole through its center into which I fix a tubular bush G, made of any suitable material, and preferably secured in position by a washer or plate H, riveted upon each end of the bush, and between which the rubber is held and slightly compressed. The upper half of the roller R, may be inclosed in a removable cover J, or if preferred it may be left uncovered.

The pin or axle K, is passed through the bush and its ends are secured to the metal frame of the caster by riveting or other like means.

For piano legs, or any other purpose, I make the bush of glass of enlarged diameter, as shown in Fig. 4, in which case I have it made with its end plates cast solid with the body, and the rubber roller being made with a correspondingly enlarged center hole, I force the bush through the rubber into the position shown. The axle passes through the glass bush and is secured to the metal frame as before described.

I wish it to be understood that although I prefer, and have therefore described the roller as being carried in a ring-shaped frame, I may use an ordinary "forked" frame having a socket or shank made according to my invention.

Having thus described my improvements in casters, what I desire to claim and secure as my invention, under Letters Patent, is:

A furniture caster comprising a roller, a supporting shank therefor having a vertical opening, the upper part of which is enlarged, the screw seated in said opening and held by the seat against downward movement, and the perforated nut screwed into the upper enlarged portion of the opening to hold the screw to its seat, substantially as described.

In testimony that I claim the foregoing as my own I have affixed hereto my signature, in presence of two witnesses, this 25th day of April, 1892.

SAMSON CHAMBERS.

Witnesses:
 ROBT. F. DRURY,
 BERNARD E. DRURY.